Patented Oct. 3, 1939

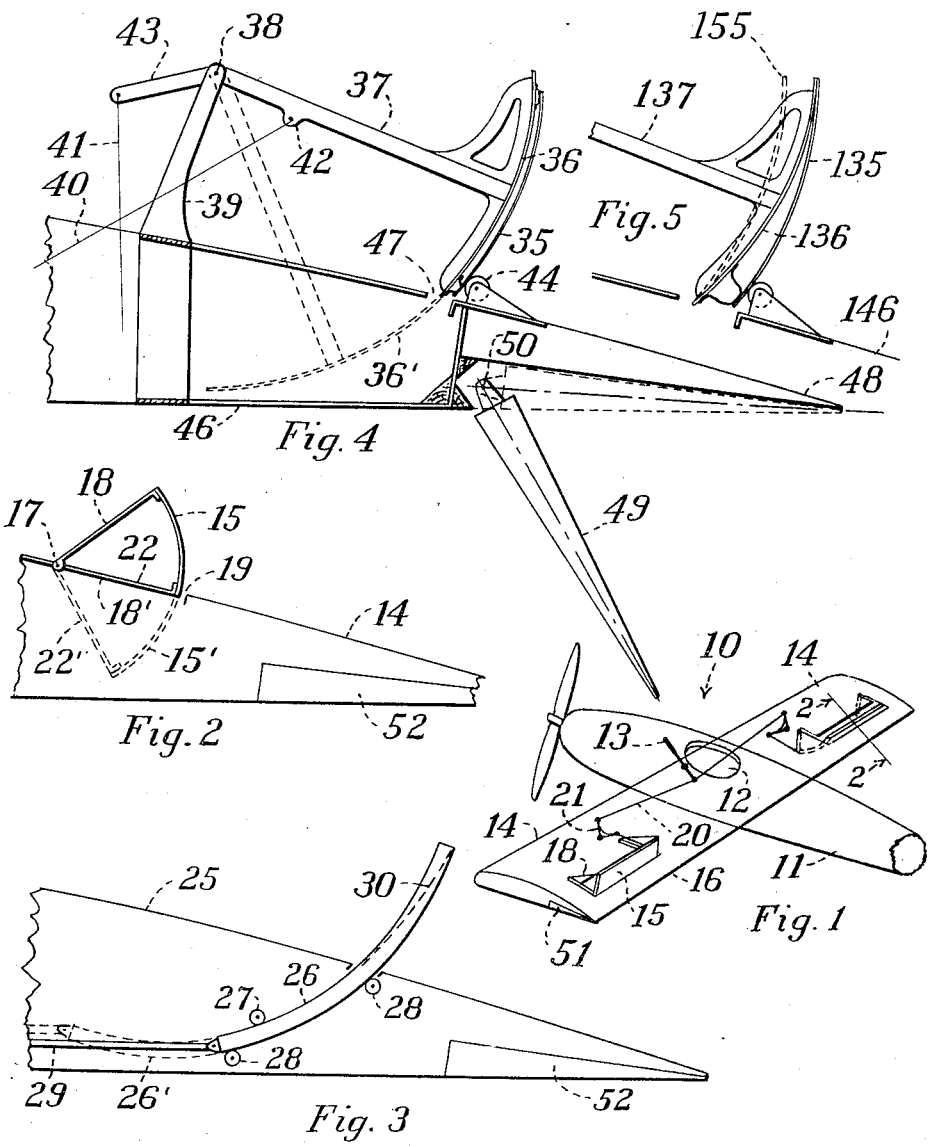

2,174,542

UNITED STATES PATENT OFFICE 2,174,542

RETRACTABLE LATERAL CONTROL AILERON

Fred E. Weick, Bethesda, Md.

Application December 22, 1937, Serial No. 181,149

1 Claim. (Cl. 244—90)

(Granted under the act of March 3, 1883, as amended April 30, 1928; 370 O. G. 757)

This invention relates to retractable lateral control ailerons, and has for an object to provide an improved lateral control means on aircraft which has the advantage of providing a more efficient control means than is available with the present conventional type of ailerons.

A further object of this invention is to provide a lateral control means which may extend the full length of the aircraft wing, and at the same time may be used, and is especially intended for use, in combination with an aircraft which is provided with a full span split flap for providing a downwardly deflectable wind brake or lift increasing device along its trailing edge.

Still a further object of this invention is to provide a lateral control means which will cause either wing to deflect downwardly without increasing the drag on the other wing, thereby increasing the effective control of the aircraft.

Still a further object of this invention is to provide a lateral control means on aircraft wings which may be operated by the aircraft joy stick in the usual manner as ordinary trailing edge ailerons and which will give the same feel as to the ordinary ailerons, and may therefore be operated by the pilot without having to learn any new process of operation.

With the foregoing and other objects in view, the invention consists in the construction, combination and arrangement of parts hereinafter described and illustrated in the drawing, in which:

Fig. 1 is a perspective schematic view of an aircraft to which this invention has been applied;

Fig. 2 is a schematic sectional view on line 2—2 of Fig. 1;

Fig. 3 is a schematic sectional view of a different type of operating mechanism of this invention;

Fig. 4 is a schematic sectional view of yet another operating mechanism and showing the same in combination with a split or lift increasing flap, and Fig. 5 is a slightly modified form of Fig. 4.

There is shown at 10 an aircraft including a fuselage 11, a pilot's cockpit 12, a control or joy stick 13, and aircraft wings 14. The aircraft wings 14, instead of being provided with the ordinary trailing edge ailerons are each provided with slidable, retractable ailerons 15 set somewhat forward of the trailing edge 16, and constituting the essence of this invention. Slidable, retractable aileron 15 is shown as being in a curved form in cross-section, but may equally well be a flat plate. This slidable retractable aileron 15 is pivoted as at 17 by connecting arms 18 and 22, arm 18 being slightly longer than the arm 22, and may be operated through a suitable opening 19 in the top of the aircraft wing 14 so as to be recessed completely into the aircraft wing, moving the aileron 15 to the position 15' and moving the lower arm 22 to position 22', while the upper arm 18 moves to the position 18', thus providing a smooth airfoil surface on top of the aircraft wing 14 while it is in retracted position. Control rods 20 are connected through a suitable differential linkage 21 to retract the aileron 15 to position 15'.

In operation, when the control or joy stick 13 is held in neutral position, the ailerons 15 on both aircraft wings 14 will remain in retracted position recessed within the aircraft wings. Movement of the joy stick 13 in either right or left direction will cause the corresponding aileron 15 to slide upwardly out of the aircraft wing 14 to the position 15, dependent upon the amount of movement of joy stick 13. Due to the differential linkage 21 the movement of the ailerons 15 will feel the same as would ordinary ailerons, that is, there will be no jerk, such as present with a straight linkage if employed to change the ailerons from a position of absolute rest to quick motion, as the joy stick is operated across the neutral position. Likewise, aileron 15 tends to retract itself to the position 15', due to the slight moment of force about pivot 17, present from the fact that arm 18 is slightly longer than supporting arm 22, so that the pressure thereon tends to urge the aileron 15 to position 15', thereby tending to normally return the joy stick to neutral position, as happens with ordinary trailing edge ailerons.

In Fig. 3 the aircraft wing 25 has a retractable aileron 26 which travels and is guided between a plurality of bearings 27 and 28, operated by a differential linkage 29 connected to the joy stick. To assist in urging this aileron 26 towards the neutral position 26', the aileron plate 30 thereof is shown as being positioned at a slight angle to that of the aileron 26 itself, the air pressure of course exerting itself against the aileron plate 30.

In Fig. 4 the aileron frame 35 is shown with its aileron plate 36 supported on an arm 37 pivoted at 38 to a support 39 and provided with control cables 40 and 41 connected to a bracket 42 on arm 37 and to arm extension 43. A bearing 44 may be provided for assisting in supporting the lower edge of the aileron frame 35 when in extended position, the aircraft wing 46 being provided with a slot 47 whereby the aileron may be recessed to the position 36' within the aircraft wing. In this case the trailing edge 48 of the aircraft wing 46 is shown as being provided with a split flap 49 pivoted at 50 and actuatable by any suitable control. Due to the position of the aileron plate 36 in advance of the trailing edge 48 both the aileron 36 and the split flap 49 may occupy as much of the wing span as desirable without interfering with each other. For the same reasons the split flap 49 may be used in combination with any of the other forms of ailerons disclosed in the preceding figures, as shown diagrammatically at 51 and 52.

It will be understood, however, that the aileron of this invention may likewise be used on an aircraft wing not having the split flap.

In Fig. 5 the aileron 135 is shown with the aileron plate 136 at an angle other than that of an arc of a circle about the pivot of arm 137 so that there is a slight moment of force about the axis of rotation, tending to urge the aileron 135 through the slot into the aircraft wing 146, an arc 155 of the circle about the pivot of the arm 137 being shown in dotted line position so that the difference in the angle of aileron 135 may be more readily appreciated.

Other modifications and changes in the proportions and arrangements of the parts may be made by those skilled in the art without departing from the nature of the invention within the scope of what is hereinafter claimed.

The invention described herein may be manufactured and used by or for the Government of the United States of America for governmental purposes without the payment of any royalties thereon or therefor.

Having thus set forth and disclosed the nature of this invention, what is claimed is:

Lateral control means for aircraft comprising a pair of ailerons slidably and retractably mounted within the aircraft wing, guide bearings for said ailerons within the aircraft wing, said guide bearings providing a trackway extending rearwardly and upwardly through the aircraft wing adjacent the rear edge thereof, each said aileron comprising a curved framework movable in its trackway and a flat plate supported in said curved framework, and control means completely within the aircraft wing for slidably extending the one or the other of said ailerons rearwardly and upwardly along said trackway above the aircraft wing to extend said flat plate at a rearwardly extending angle to the line of flight, and providing a moment of force urging said aileron into retracted position within the aircraft wing on reversal of the control means.

FRED E. WEICK.